United States Patent

Alapati et al.

(10) Patent No.: US 8,930,760 B2
(45) Date of Patent: Jan. 6, 2015

(54) VALIDATING CACHE COHERENCY PROTOCOL WITHIN A PROCESSOR

(71) Applicant: International Business Machines Corporation, Armonk, NY (US)

(72) Inventors: Sangram Alapati, Austin, TX (US); Prathiba Kumar, Tamil Nadu (IN); Varun Mallikarjunan, Bangalore (IN); Satish K. Sadasivam, Tamil Nadu (IN)

(73) Assignee: International Business Machines Corporation, Armonk, NY (US)

(*) Notice: Subject to any disclaimer, the term of this patent is extended or adjusted under 35 U.S.C. 154(b) by 107 days.

(21) Appl. No.: 13/716,849

(22) Filed: Dec. 17, 2012

(65) Prior Publication Data

US 2014/0173222 A1    Jun. 19, 2014

(51) Int. Cl.
G06F 11/00    (2006.01)
G06F 12/08    (2006.01)

(52) U.S. Cl.
CPC .................................. *G06F 12/0891* (2013.01)
USPC ............. 714/33; 714/715; 714/796; 712/234; 711/144

(58) Field of Classification Search
CPC ... G06F 11/2236; G06F 11/2273; G06F 7/02; G06F 9/30043; G06F 9/30098; G06F 9/3834; G06F 9/3836; G11C 2029/0401; G11C 29/16
See application file for complete search history.

(56) References Cited

U.S. PATENT DOCUMENTS

| | | | |
|---|---|---|---|
| 5,748,879 A | 5/1998 | Kobayashi | |
| 5,956,478 A | 9/1999 | Huggins | |
| 6,026,413 A | 2/2000 | Challenger et al. | |
| 6,079,006 A | 6/2000 | Pickett | |
| 6,446,241 B1 | 9/2002 | Mobley et al. | |
| 6,732,356 B1 | 5/2004 | Chen | |
| 6,751,792 B1 | 6/2004 | Nair | |
| 6,782,518 B2 | 8/2004 | Decker | |
| 7,441,110 B1 | 10/2008 | Puzak et al. | |
| 7,533,294 B2 | 5/2009 | Mishra et al. | |
| 7,661,023 B2 | 2/2010 | Arora et al. | |
| 2002/0144101 A1 | 10/2002 | Wang et al. | |
| 2003/0188044 A1 | 10/2003 | Bohizic et al. | |
| 2003/0188224 A1 | 10/2003 | Decker | |

(Continued)

OTHER PUBLICATIONS

U.S. Appl. No. 13/159,564, 1 page.

(Continued)

*Primary Examiner* — Scott Baderman
*Assistant Examiner* — Jason Bryan
(74) *Attorney, Agent, or Firm* — Francis Lammes; Stephen J. Walder, Jr.; Parashos T. Kalaitzis

(57) ABSTRACT

A mechanism is provided for effectively validating cache coherency within a processor. For each node in a set of nodes, responsive to a node in a set of nodes being a controlling node, at least one action is performed on each controlled node mapped to the controlling node. After performing the at least one action on each controlled node mapped to the controlling node or responsive to the node failing to be a controlling node, a self-modifying branch test pattern is executed based on the selected execution pattern in the condition register through the set of nodes. Responsive to the self-modifying branch test pattern ending, values output from the execution unit during execution of the self-modifying branch test pattern are compared to a set of expected results. Responsive to a match of the comparison for the execution patterns in the set of execution patterns, the execution unit is validated.

20 Claims, 11 Drawing Sheets

(56) References Cited

U.S. PATENT DOCUMENTS

| | | |
|---|---|---|
| 2004/0008825 A1 | 1/2004 | Seeley et al. |
| 2006/0107158 A1 | 5/2006 | Mishra et al. |
| 2006/0174174 A1 | 8/2006 | Bohizic et al. |
| 2008/0126771 A1 | 5/2008 | Chen et al. |
| 2008/0235498 A1 | 9/2008 | Yamada |
| 2010/0037036 A1 | 2/2010 | Hum et al. |
| 2010/0262813 A1 | 10/2010 | Brown et al. |

OTHER PUBLICATIONS

Moudgill, Mayan et al., "Validation of Turandot, a Fast Processor Model for Microarchitecture Exploration", IEEE International Performance, Computing and Communications Conference (IPCCC), Feb. 1999, 7 pages.

U.S. Appl. No. 14/069,839, 1 page.

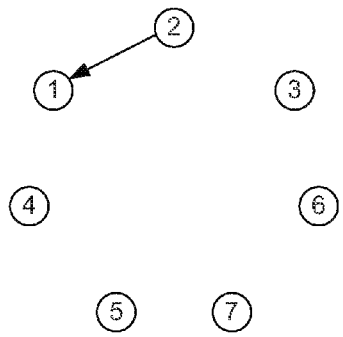
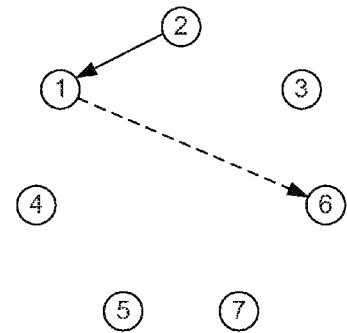
FIG. 7A                    FIG. 7B
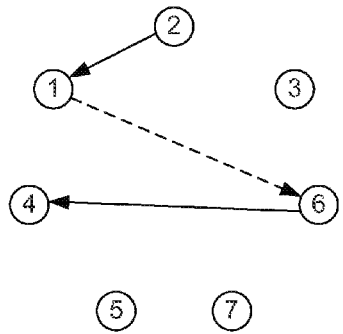
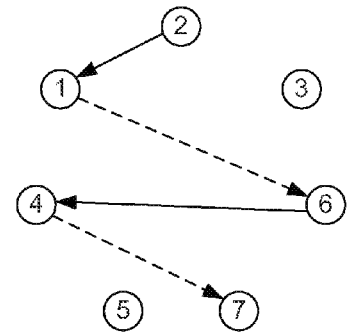
FIG. 7C                    FIG. 7D
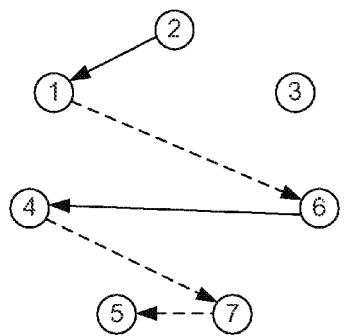
FIG. 7E

VALIDATING CACHE COHERENCY PROTOCOL WITHIN A PROCESSOR

BACKGROUND

The present application relates generally to an improved data processing apparatus and method and more specifically to mechanisms for validating cache coherency protocol within a processor.

Modern processors employ multiple levels of cache to reduce demands of increasing memory bandwidth. Of these levels of cache, Level 3 (L3) cache and Level 2 (L2) cache typically are shared among instructions and data, while Level 1 (L1) cache is kept separate for instructions and data. Therefore, coherency hardware is incorporated into the modern processors to keep L1 Instruction cache (L1 I-Cache) and L1 Data Cache (L1 D-Cache) portions of the L1 cache coherent. Thus, it is of paramount importance that the I-Cache and D-Cache of a processor be kept coherent, which requires internal cache synchronization techniques that detect modifications to lines that are shared by the I-side and D-side caches to keep both the cache copies coherent. Validation of such coherency in post silicon validation is a difficult task and, to date, there have been no effective mechanisms that validate such coherency.

SUMMARY

In one illustrative embodiment, a method, in a data processing system, is provided for validating cache coherency within a processor. The illustrative embodiment generates a self-modifying branch test pattern for execution by one or more processors that is under validation testing. The illustrative embodiment selects an execution pattern from a set of execution patterns thereby forming a selected execution pattern. The illustrative embodiment loads the selected execution pattern into a condition register. For each node in a set of nodes, the illustrative embodiment determines whether a node in a set of nodes is a controlling node and, responsive to the node being a controlling node, performs at least one action on each controlled node mapped to the controlling node. The illustrative embodiment executes the self-modifying branch test pattern based on the selected execution pattern in the condition register through the set of nodes after performing the at least one action on each controlled node mapped to the controlling node or responsive to the node failing to be a controlling node. The illustrative embodiment compares values output during execution of the self-modifying branch test pattern to a set of expected results in response to the self-modifying branch test pattern ending. The illustrative embodiment repeats the process for each execution pattern in the set of execution patterns in response to a match of the comparison. The illustrative embodiment validates the cache coherency in response to a match of the comparison for the execution patterns in the set of execution patterns.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 7A-7E illustrate an example of the exemplary execution path taken with a given execution pattern through the generated branch test pattern of FIG. 6A as well as the swap patterns in FIGS. 6B-6D, when encountered, in accordance with an illustrative embodiment;

DETAILED DESCRIPTION

The illustrative embodiments provide a self-modifying mechanism to stress and validate L1 Instruction cache (L1 I-Cache) and L1 Data Cache (L1 D-Cache) coherency protocol of a processor. The mechanism generates a graph structure for the test case, selects a set of controlling nodes and controlled nodes from the generated graph structure to avoid various deadlocks and conflicts, and populates the controlling nodes and controlled with instructions which will stress the L1 I-cache coherency and L1 D-cache coherency logic. Controlling nodes modify the controlled nodes thereby instantiating a self-modifying code capability of the test generation process.

Figure 1:
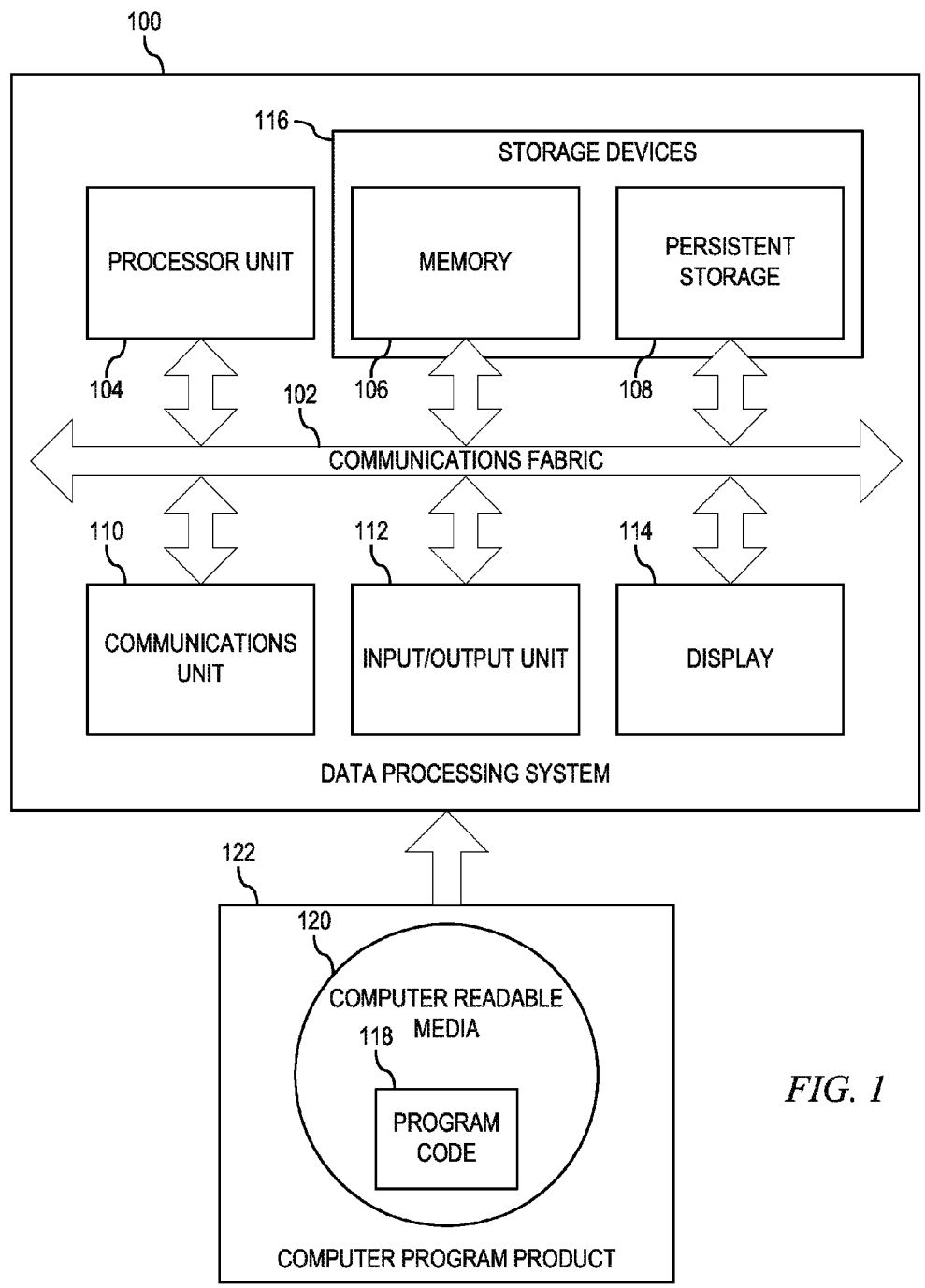
FIG. 1 depicts a block diagram of a data processing system in which illustrative embodiments may be implemented.
Figure 2:
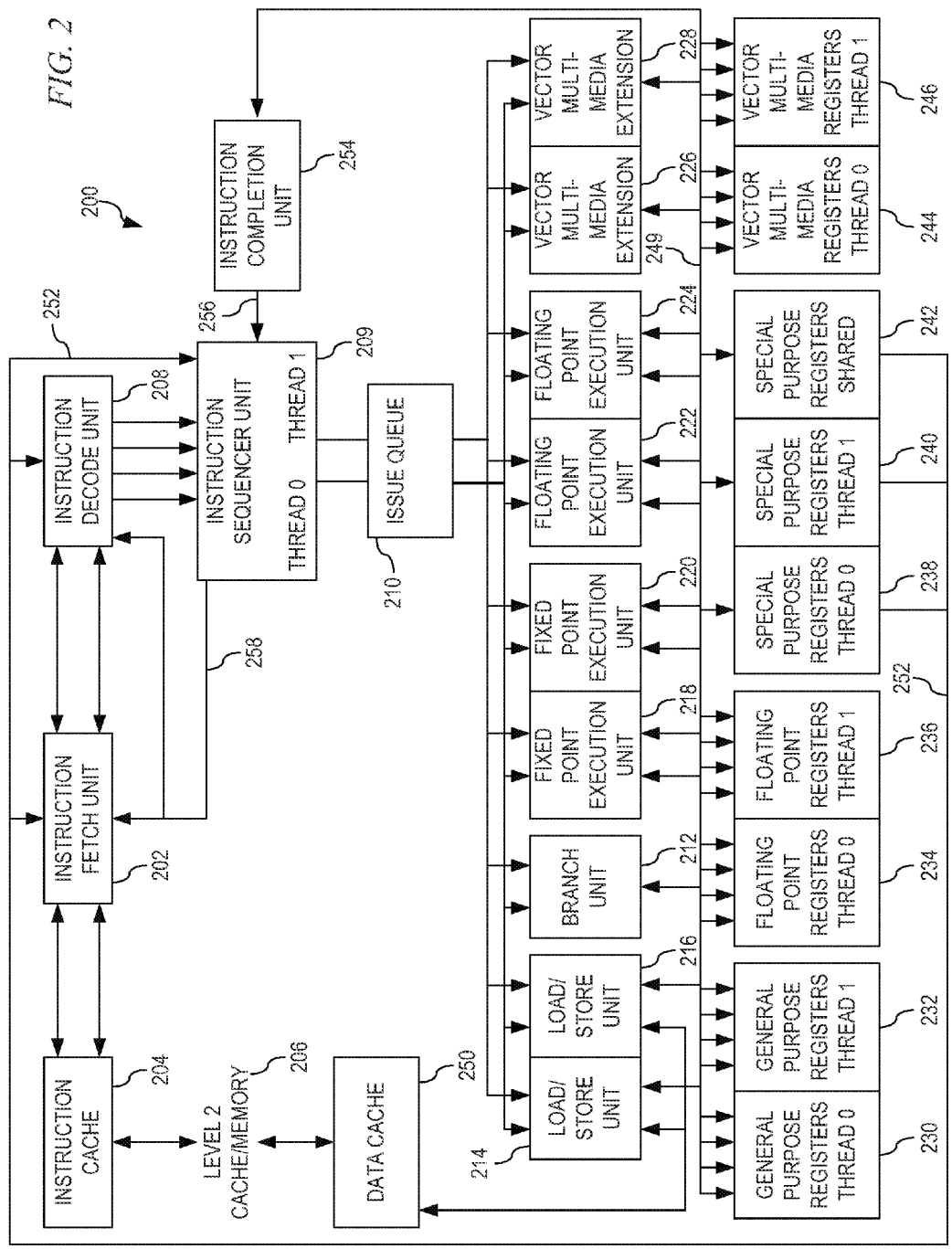
FIG. 2 depicts an exemplary block diagram of a conventional dual threaded processor design showing functional units and registers in accordance with an illustrative embodiment.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form. In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional dual threaded processor design showing functional units and registers is depicted in accordance with an illustrative embodiment. Processor 200 may be implemented as processing unit 104 in FIG. 1 in these illustrative examples. Processor 200 comprises a single integrated circuit superscalar microprocessor with dual-thread simultaneous multithreading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Again, the illustrative embodiments provide a self-modifying mechanism to stress and validate L1 Instruction cache (L1 I-Cache) and L1 Data Cache (L1 D-Cache) coherency protocol of a processor. The mechanism generates a graph structure for the test case, selects a set of controlling nodes and controlled nodes from the generated graph structure, and populates the controlling nodes with instructions which will stress the L1 I-cache coherency and L1 D-cache coherency logic. Controlling nodes modify the branch instructions in the controlled nodes thereby instantiating a self-modifying code capability of the test generation process.

Figure 3:
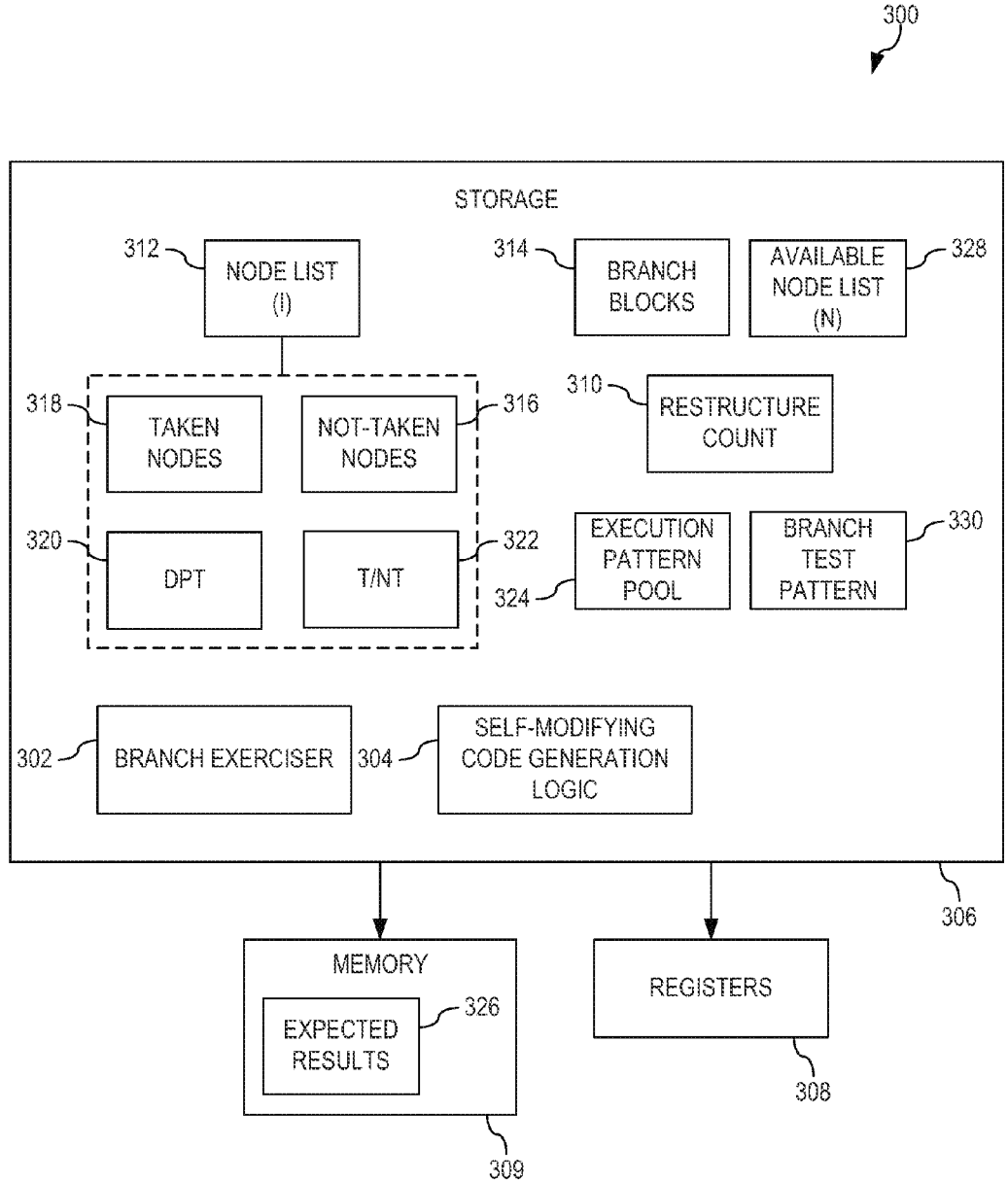
FIG. 3 depicts a block diagram of a validation mechanism for effectively validating execution units within a processor in accordance with an illustrative embodiment.

FIG. 3 depicts a block diagram of a validation mechanism for effectively validating cache coherency within a processor in accordance with an illustrative embodiment. Data processing system 300 comprises branch exerciser 302 and self-modifying code generation logic 304 within storage 306, as well as registers 308 and memory 309. In order to validate L1 I-cache coherency and L1 D-cache coherency logic, branch exerciser 302 initializes and sets restructure count 310 and a set of initial nodes (I) 312. Restructure count 310 specifies a number of times a new branch test pattern needs to be generated. The restructure count 310 and the number of initial nodes (I) 312 may be provided as inputs from a user of the validation mechanism. In setting up the set of initial nodes (I) 312, branch exerciser 302 allocates a portion of storage 306 as instruction memory within which branch blocks of instructions 314 will later be created. Each node in the set of initial nodes (I) 312 may be considered as an instruction block with a mix of random instructions and branches. The most basic version of such a node may be an add instruction to update a register followed by a branch instruction that transfers control to another node (instruction block) based on a condition (i.e. based on a particular Condition Register bit). Also, the type of branch instructions (branches to Count/Link Register, Relative Branches, Absolute branches, etc.) may be chosen randomly for each node. For each node in the set of initial nodes (I) 312, branch exerciser 302 also assigns random increasing addresses within the allocated instruction memory to each node. Each node has a pair of branch instructions. The condition on which the branch instructions are taken is complementary (i.e., one branch instruction transfers control to its target if the condition it is dependent on is TRUE and the other branch instruction transfers control to its target if the same condition it is dependent on is FALSE.

Additionally, branch exerciser 302 also sets up a number of data structures for each node that will aid in the branch pattern and self-modifying code generation and simulation for verification of L1 I-cache coherency and L1 D-cache coherency logic. Not-taken node data structure 316 records a not-taken path (node) for a current node. Taken node data structure 318 records a taken path (node) for the current node. This taken and not-taken information is used by simulation logic to calculate the expected path that will be taken through the graph for a given execution pattern. In order to prevent infinite loops/deadlock scenarios, such as infinite loops that may occur when instruction execution is stuck between a set of nodes, deadlock prevention table (DPT) 320 records for each node, the set of nodes that cannot be chosen for the taken/not-taken paths from the current node. Finally, taken/not-taken (TINT) candidate list 322 records the list of nodes that may be chosen for the taken/not-taken paths from the current node. The illustrative embodiments represent the initial set of nodes as I={xEI: x>0} and another set of nodes as M={xEI: x is already chosen for a previous iteration}.

In building the branch test pattern, branch exerciser 302 copies the set of initial nodes (I) 312 to a set of available nodes (N) 328. Branch exerciser 302 then randomly picks a node 'n' from the set of available nodes (N) 328, where N is the set of nodes that still need to be processed. Branch exerciser 302 then removes 'n' from the set of available nodes (N) 328 to avoid picking the same node for a subsequent iteration. Branch exerciser 302 then updates deadlock prevention table (DPT) 320 of the randomly selected node to avoid picking a node that can lead to an infinite loop or deadlock. In performing the update, for each node 'm' in the deadlock prevention table for node 'n', branch exerciser 302 reads the deadlock prevention table for node 'm', adds the unreachable nodes from deadlock prevention table (DPT) 320 of node 'm' to deadlock prevention table (DPT) 320 of node 'n', and repeats these steps recursively until all the unreachable nodes for the node 'm' are added to the deadlock prevention table (DPT) 320 of node 'n'.

Once the deadlock prevention table (DPT) 320 of node 'n' has been updated, branch exerciser 302 removes all the nodes that are in the DPT of node 'n' from the set of available nodes I-'n' to create a candidate list (C) from which taken/not-taken nodes are randomly selected. That is, consider a set D that contains all nodes in the deadlock prevention table (DPT) 320 for node 'n'. Then, consider a set C=I-D-'n', i.e. the set of nodes in the initial set of nodes (I) 312 that are not in the deadlock prevention table (DPT) 320 for node 'n'. This set C is the taken/not-taken (T/NT) candidate list 322 for node 'n'.

Branch exerciser 302 then randomly selects two nodes {x, y} from the taken/not-taken (T/NT) candidate list (C) 322 for a taken path (x) and a not-taken path (y). In order for this step to be properly performed, there must be at least two nodes in taken/not-taken (T/NT) candidate list 322. If there are at least two nodes in taken/not-taken (T/NT) candidate list 322, then branch exerciser 302 records the taken node in taken node data structure 318 and not-taken node in not-taken node data structure 316 for the current node.

Branch exerciser 302 then adds node 'n' to the deadlock prevention table (DPT) 320 of node 'x' and node 'y'. If the taken/not-taken (T/NT) candidate list 322 contains only one element or less than one element, i.e. there is only one node or no node that is reachable through the taken and not-taken paths from the current node, then such a node is considered and marked as an end node. For example, once execution reaches the end node, the dynamic branch pattern test case is considered to have completed execution. This build process then repeats until a point is reached such that the set N becomes NULL, i.e. all the nodes have been processed.

Branch exerciser 302 then generates an execution pattern pool 324 in which execution patterns, which may be loaded into the Condition Register (CR) before every re-execution, are stored. Each execution pattern may be either user defined or pseudo-randomly generated. In addition, branch exerciser 302 generates expected results 326 for each execution pattern in the execution pattern pool 324. Branch exerciser 302 stores expected results 326 in memory 309. These expected results contain the expected counts for the taken and not-taken paths.

With at least one branch test pattern created, during every re-execution, branch exerciser 302 selects a pattern from the execution pattern pool 324, loads the pattern into the Condition Register and then executes branch test pattern 330 on the target hardware. Again, the execution pattern comprises control bits that control the flow of branches in the generated branch test pattern 330. With different execution patterns, the taken or not-taken paths for each node are varied during each and every re-execution. By varying the control bits in the execution pattern, the taken and not-taken paths from each and every node may be varied. A different execution pattern during each re-execution of a same branch test pattern ensures that although the instructions do not change, since the branch instructions are dependent on particular control bits, a different execution pattern produces a different condition which causes the branch to go to a node that is different from the one in the previous re-execution. Thus, for the same branch test pattern, the overall execution paths between the branch blocks differ with each differing execution pattern. This causes the processor control logic to frequently flush instructions (and discard their results) fetched from the mispredicted path and redirect instruction fetching to the alternate path which causes interesting micro-architectural scenarios. This extreme dynamism in the branch paths also causes internal hardware based branch prediction data structures such as the Local Branch History Table (LBHT), Global Branch History Table (GBHT), Global History Vector (GHV), or the like, that remember previous branch outcomes, to be updated and/or rolled frequently.

FIGS. 4A-4G show one example of the test case build process performed by a branch exerciser, such as branch exerciser 302 of FIG. 3, in accordance with an illustrative embodiment. This example is illustrated using seven nodes, although the illustrative embodiments are very scalable so that thousands of nodes can be built for a single test case execution. Considering the seven-node example to explain the methodology described in FIG. 3, such that the set of available nodes (N)=I={1, 2, 3, 4, 5, 6, 7}.

Figure 4A:
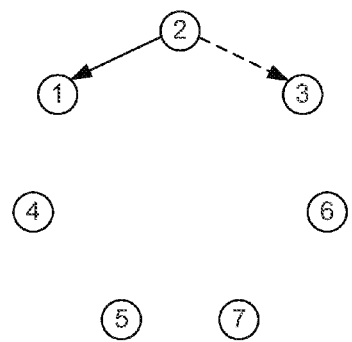
FIGS. 4A-4G show one example of the test case build process performed by a branch exerciser in accordance with an illustrative embodiment.

In a first iteration shown in FIG. 4A, the branch exerciser randomly picks node 'n'=2 from N={1, 2, 3, 4, 5, 6, 7}. The branch exerciser removes 'n'=2 from set N, such that the set of available nodes (N) still to be processed={1, 3, 4, 5, 6, 7}. The branch exerciser updates the deadlock prevention table (DPT) for node 'n'=2. Since node 2 was chosen as the first node, the DPT for node 2 is currently empty. The branch exerciser then adds nodes to the T/NT candidate list of node 2. Since the DPT for node 2 which is the set D is currently a NULL set, the T/NT candidate list C={1, 3, 4, 5, 6, 7}. The branch exerciser then randomly picks node 'x'=1 and node 'y'=3, for the taken and not-taken paths respectively from node 'n'=2. The branch exerciser records the taken path and not-taken path for 'n'=2 as shown:

| Node | Taken | Not-Taken |
|---|---|---|
| 2 | 1 | 3 |

The branch exerciser then adds node 2 to the deadlock prevention table (DPT) of nodes 1 and 3 as shown:

| Node | Unreachable nodes |
|---|---|
| 1 | 2 |
| 2 |   |
| 3 | 2 |
| 4 |   |
| 5 |   |
| 6 |   |
| 7 |   |

Figure 4B:
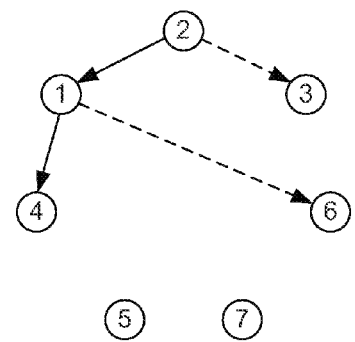

In a second iteration shown in FIG. 4B, the branch exerciser randomly picks node 'n'=1 from N=(1, 3, 4, 5, 6, 7. The branch exerciser removes 'n'=1 from set N, such that the set of available nodes (N) still to be processed={3, 4, 5, 6, 7}. The branch exerciser updates the deadlock prevention table (DPT) for node 'n'=1. The DPT for 'n'=1 is {2}. Thus, the branch exerciser adds all unreachable nodes from node 2(={NULL}) to the DPT for node 1. Therefore, the DPT for node 1={2}, shown below. The branch exerciser then adds nodes to the T/NT candidate list of node 1. Since the DPT for node 1 which is the set D={2}, the T/NT candidate list C={3, 4, 5, 6, 7}. The branch exerciser randomly picks node 'x'=4 and node 'y'=6, for the taken and not-taken paths respectively from node 'n'=1. The branch exerciser records the taken and not-taken paths for 'n'=1 as shown:

| Node | Taken | Not-Taken |
|------|-------|-----------|
| 2    | 1     | 3         |
| 1    | 4     | 6         |

The branch exerciser then adds node 1 to the deadlock prevention table (DPT) of nodes 4 and 6 as shown:

| Node | Unreachable nodes |
|------|-------------------|
| 1    |                   |
| 2    |                   |
| 3    |                   |
| 4    | 2                 |
| 5    | 1                 |
| 6    |                   |
| 7    | 1                 |

Figure 4C:
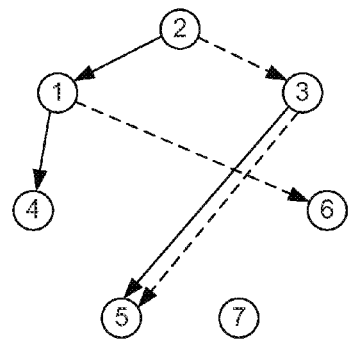

In a third iteration shown in FIG. 4C, the branch exerciser randomly pick node 'n'=3 from N={3, 4, 5, 6, 7}. The branch exerciser removes 'n'=3 from set N, such that the set of available nodes (N) still to be processed={4, 5, 6, 7}. The branch exerciser updates the deadlock prevention table (DPT) for node 'n'=3. The DPT for 'n'=3 is {2}. Thus, the branch exerciser add all unreachable nodes from node 2(={NULL}) to the DPT for node 3. Therefore, the DPT for node 3=(2), shown below. The branch exerciser then adds nodes to the T/NT candidate list of node 3. Since the DPT for node 3 which is the set D=(2), the T/NT candidate list C={1, 4, 5, 6, 7}. The branch exerciser randomly picks node 'x'=5 and node 'y'=5, for the taken and not-taken paths respectively from node 'n'=3. The branch exerciser records the taken and not-taken paths for 'n'=3 as shown.

| Node | Taken | Not-Taken |
|------|-------|-----------|
| 2    | 1     | 3         |
| 1    | 4     | 6         |
| 3    | 5     | 5         |

The branch exerciser then adds node 3 to the deadlock prevention table (DPT) of node 5 as shown:

| Node | Unreachable nodes |
|------|-------------------|
| 1    |                   |
| 2    |                   |
| 3    | 2                 |
| 4    | 1                 |
| 5    | 3                 |
| 6    | 1                 |
| 7    |                   |

Figure 4D:
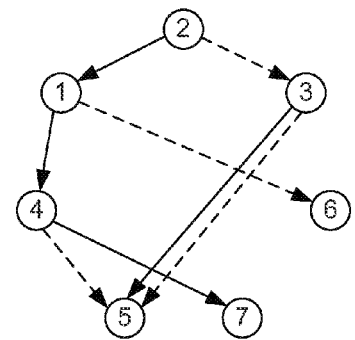

In a fourth iteration shown in FIG. 4D, the branch exerciser randomly picks node 'n'=4 from N={4, 5, 6, 7}. The branch exerciser removes 'n'=4 from set N, such that the set of available nodes (N) still to be processed={5, 6, 7}. The DPT for 'n'=4 is {1}. Thus, the branch exerciser add all unreachable nodes from node 1(={2}) to the DPT for node 4. The branch exerciser then recursively adds the unreachable nodes from nodes 2 to the DPT of node '4'. Therefore, the DPT for node 4={1, 2}, shown below. The branch exerciser then adds nodes to the T/NT candidate list of node 4. Since the DPT for node 4 which is the set D={1, 2}, the T/NT candidate list C={3, 5, 6, 7}. The branch exerciser randomly picks node 'x'=7 and node 'y'=5, for the taken and not-taken paths respectively from node 'n'=4. The branch exerciser records the taken and not-taken paths for 'n'=4 as shown:

| Node | Taken | Not-Taken |
|------|-------|-----------|
| 2    | 1     | 3         |
| 1    | 4     | 6         |
| 3    | 5     | 5         |
| 4    | 7     | 5         |

The branch exerciser then adds node 4 to the deadlock prevention table (DPT) of nodes 5 and 7 as shown:

| Node | Unreachable nodes |
|------|-------------------|
| 1    |                   |
| 2    |                   |
| 3    | 2                 |
| 4    | 1, 2              |
| 5    | 3, 4              |
| 6    | 1                 |
| 7    | 4                 |

Figure 4E:
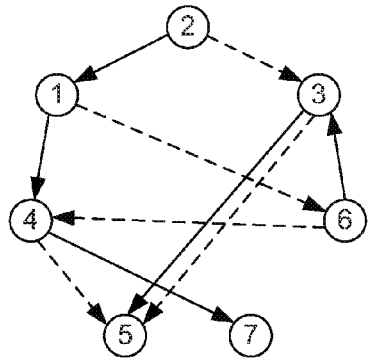

In a fifth iteration shown in FIG. 4E, the branch exerciser randomly pick a node 'n'=6 from N={5, 6, 7}. The branch exerciser removes 'n'=6 from set N, such that the set of available nodes (N) still to be processed={5, 7}. The branch exerciser updates the deadlock prevention table (DPT) for node 'n'=6. The current DPT for 'n'=6 is {1}. The branch exerciser adds all unreachable nodes from node 1(={2}) to the DPT for node 6. The branch exerciser then recursively adds the unreachable nodes from nodes 2 to the DPT of node '6'. Thus, the DPT for node 6={1, 2}, shown below. The branch exerciser then adds nodes to the T/NT candidate list of node 6. Since the DPT for node 6={1, 2}, the branch exerciser adds nodes to the T/NT candidate list of node 6, such that the T/NT candidate list C={3, 4, 5, 7}. The branch exerciser randomly pick node 'x'=3 and node 'y'=4, for the taken and not-taken paths respectively from node 'n'=6. The branch exerciser records the taken and not-taken paths for 'n'=6 as shown below:

| Node | Taken | Not-Taken |
|------|-------|-----------|
| 2    | 1     | 3         |
| 1    | 4     | 6         |
| 3    | 5     | 5         |
| 4    | 7     | 5         |
| 6    | 3     | 4         |

The branch exerciser then adds node 6 to the deadlock prevention table (DPT) of nodes 3 and 4 as shown:

| Node | Unreachable nodes |
|------|-------------------|
| 1    |                   |
| 2    |                   |
| 3    | 2, 6              |
| 4    | 1, 2, 6           |
| 5    | 3, 4              |
| 6    | 1, 2              |
| 7    | 4                 |

Figure 4F:
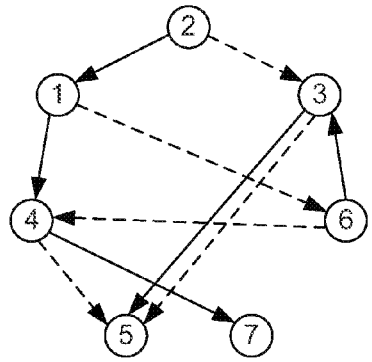

In a sixth iteration shown in FIG. 4F, the branch exerciser randomly pick a node 'n'=5 from N={5, 7}. The branch exerciser removes 'n'=5 from set N, such that the set of available nodes (N) still to be processed={7}. The branch exerciser updates the deadlock prevention table (DPT) for node 'n'=5. The current DPT for 'n'=5 is {3, 4}. The branch exerciser adds all unreachable nodes from node 3(={2, 6}) and node 4(={1, 2, 6}) to the DPT for node 5. The branch exerciser then recursively adds the unreachable nodes from nodes 1, 2, and 6 to the DPT of node '5'. Thus, the DPT for node 5={1, 2, 3, 4, 6}, shown below. The branch exerciser then adds nodes to the T/NT candidate list of node 5. Since the DPT for node 5={1, 2, 3, 4, 6}, the branch exerciser adds nodes to the T/NT candidate list of node 5, such that the T/NT candidate list C={7}. Since there is only one node (=7) that is reachable from node 5, this is identified as the endpoint of the algorithm and node 5 is designated as the end node, i.e. the execution ends after control reaches this node.

| Node | Unreachable nodes |
|---|---|
| 1 | 2 |
| 2 | |
| 3 | 2, 6 |
| 4 | 1, 2, 6 |
| 5 | 3, 4, 1, 2, 6 |
| 6 | 1, 2 |
| 7 | 4 |

Figure 4G:
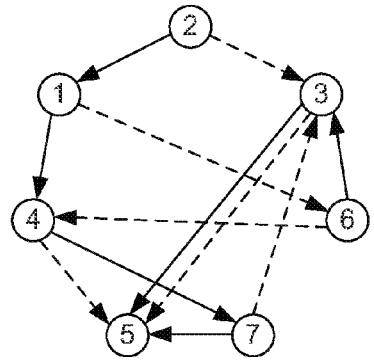

In a seventh iteration shown in FIG. 4G, the branch exerciser randomly picks a node 'n'=7 from N={7}. The branch exerciser removes 'n'=7 from set N, such that the set of available nodes (N) still to be processed={NULL}. The branch exerciser updates the deadlock prevention table (DPT) for node 'n'=7. The current DPT for 'n'=7 is {4}. The branch exerciser adds all unreachable nodes from node 4(={1, 2, 6}) to the DPT for node 7. Thus, the DPT for node 7={1, 2, 4, 6}, shown below. The branch exerciser then recursively adds the unreachable nodes from nodes 1, 2, and 6 to the DPT of node '7'. The branch exerciser then adds nodes to the T/NT candidate list of node 7. Since the DPT for node 7={1, 2, 4, 6}, the branch exerciser adds nodes to the T/NT candidate list of node 7, such that the T/NT candidate list C={3, 5}. The branch exerciser randomly pick node 'x'=5 and node 'y'=3, for the taken and not-taken paths respectively from node 'n'=7. The branch exerciser records the taken and not-taken paths for 'n'=7 as shown below:

| Node | Taken | Not-Taken |
|---|---|---|
| 2 | 1 | 3 |
| 1 | 4 | 6 |
| 3 | 5 | 5 |
| 4 | 7 | 5 |
| 6 | 3 | 4 |
| 7 | 5 | 3 |

The branch exerciser then adds node 7 to the deadlock prevention table (DPT) of nodes 3 and 5 as shown:

| Node | Unreachable nodes |
|---|---|
| 1 | 2 |
| 2 | |
| 3 | 2, 6, 7 |
| 4 | 1, 2, 6 |
| 5 | 3, 4, 1, 2, 6, 7 |
| 6 | 1, 2 |
| 7 | 4, 1, 2, 6 |

In accordance with the illustrative embodiments, stressing and validating L1 Instruction cache (L1 I-Cache) and L1 Data Cache (L1 D-Cache) coherency protocol of a processor may be performed in three different implementations. In a first implementation, the controlling node is instructed to swap the branch instructions as well as reverse the conditions that the branches are dependent on. In this case, for a given execution pattern, the execution path through the graph structure will be different to the execution path through the same graph structure without self-modification. In a second implementation, the controlling node is instructed to only swap the branches and correct the target address/displacement fields, while leaving the conditions encoded in the branch instructions as is. In this case, for a given execution pattern, the execution path through the graph structure will be same as the execution path through the same graph structure without self-modification. In a third implementation, the controlling node is instructed to only reverse the conditions encoded in the branch instructions without swapping the branches. In this case, for a given execution pattern, the execution path through the graph structure will be different to the execution path through the same graph structure without self-modification.

For example, in a base case where node 2 jumps to node 4 if a condition register value associated with the node is a 1 and jumps to node 8 if the same condition register value is a 0, the base case without self-modification would look like:

Branch to node 4 (if CR=1)
Branch to node 8(if CR=0)

For the first implementation where the controlling node is instructed to swap the branch instructions and reverse the conditions that the branches are dependent on, the base case would be modified to look like:

Branch to node 8(if CR=1)
Branch to node 4 (if CR=0)

For the second implementation where the controlling node is instructed to only swap the branch instructions without reversing the conditions that the branch are dependent on, the base case would be modified to look like:

Branch to node 8(if CR=0)
Branch to node 4 (if CR=1)

For the third implementation where the controlling node is instructed to only reverse the conditions that the branch are dependent on without swapping the branch instructions, the base case would be modified to look like:

Branch to node 4 (if CR=0)
Branch to node 8(if CR=1)

Therefore, returning to FIG. 3, once branch exerciser identifies set of nodes (I) 312 and generates branch test patterns 330 for set of nodes (I) 312, self-modifying code generation logic 304 pseudo-randomly selects a subset of set of nodes (I) 312 as controlling nodes that are mapped to another subset of set of nodes (I) 312, which are referred to as controlled nodes. Self-modifying code generation logic 304 maps each controlling node to one or more controlled nodes. Furthermore, a node may be both a controlled node and a controlling node. Each controlling node is designed in such a way as to have the taken and not-taken paths of the controlled nodes modified by employing/using the self-modifying code generation logic 304 to swap the pair of branch instructions in that node or reverse the conditions of the pair of branches in the controlled node(s), which, as explained earlier, is encoded within the instruction itself and upon which the branch instructions are dependent or swap the branches as well as reverse the conditions. Self-modifying code generation logic 304 also generates instructions in the end node that nullifies (rewinds) the changes made by the controlling nodes so as to restore the graph to its original configuration at the end of every execution.

Once self-modifying code generation logic 304 completes the selection of controlling nodes and controlled nodes and maps each of the controlling nodes to one or more controlled nodes, branch exerciser 302 then calls the simulation logic which for each execution pattern traces the execution through the graph assuming that the self-modification is always successful. The simulation logic then stores the expected results and path information which is then compared to the results or path of the actual execution on the target platform.

Once self-modifying code generation logic 304 completes the selection of controlling nodes and controlled nodes and maps each of the controlling nodes to one or more controlled nodes, branch exerciser 302 then begins execution of the generated branch test pattern. Branch exerciser 302 loads a selected test pattern into a condition register (CR).

In accordance with the first embodiment (i.e. where the branches are swapped as well as conditions are reversed), upon executing the branch test pattern, for the first encountered controlling node, self-modifying code generation logic 304 swaps the taken and not-taken branch instruction locations associated with each of the controlled node(s) associated with the controlling node. During the process of swapping, self-modifying code generation logic 304 corrects a displacement field of the branch instructions (or a link or count register for indirect branch instructions) in order to get the correct target node address, since the branch instructions for the taken and not-taken paths are now at different addresses due to the swap of the taken branch and not-taken branch of the controlled nodes. For example, the distance between the "taken" node and the "taken" branch instruction (the first of the pair of branch instructions in a node) might be "x" and similarly the distance between the "not-taken" node and the "not-taken" branch instruction (the second of the pair of branch instructions in a node) might be "y." Now, when the branches are actually swapped, the distance between the first branch instruction and the "taken" node decreases by the size of one instruction and the distance between the second branch instruction and the "not-taken" node increases by the size of one instruction.

Additionally, self-modifying code generation logic 304 also reverses conditions, which are encoded as part of the branch instruction operation code, on which the branch instructions are dependent. For example, originally if the first branch is taken (i.e. transfers control to the "taken node" if the condition bit in the condition register that it depends on is a 1 then the second branch is taken (i.e. transfers control to the "not taken node" if the same condition bit (in the condition register) that it depends on is a 0. Now, self-modifying code generation logic 304 reverses these conditions. That is, now the first branch (which was the second branch prior to the swap) will be "taken" if the condition bit it is dependent on is a 1 and the second branch (which was the first branch prior to the swap) will be "taken" if the same condition bit is a 0. In another embodiment, the controlling node may also only choose to modify the conditions encoded in the branch instructions (that is without swapping them). Thus in effect, for every swap, if the conditions are also reversed, the path taken through the graph for each execution pattern is different from the path taken without self-modification. Thus, the actual results have to be compared with the simulation (or expected) results.

In accordance with the second embodiment (i.e. where only the branches are swapped) upon executing the branch test pattern, for the first encountered controlling node, self-modifying code generation logic 304 swaps the taken and not-taken branch instruction locations associated with each of the controlled node(s) associated with the controlling node. During the process of swapping, self-modifying code generation logic 304 corrects a displacement field of the branch instructions (or a link or count register for indirect branch instructions) in order to get the correct target node address, since the branch instructions for the taken and not-taken paths are now at different addresses due to the swap of the taken branch and not-taken branch of the controlled nodes. For example, the distance between the "taken" node and the "taken" branch instruction (the first of the pair of branch instructions in a node) might be "x" and similarly the distance between the "not-taken" node and the "not-taken" branch instruction (the second of the pair of branch instructions in a node) might be "y." Now, when the branches are actually swapped, the distance between the first branch instruction and the "taken" node decreases by the size of one instruction and the distance between the second branch instruction and the "not-taken" node increases by the size of one instruction. Thus in effect, if only branches are swapped, the path taken through the graph for each execution pattern is the same with or without self-modification. In this mode of self-modification for each execution pattern, the result from executing with self-modification can be directly compared to the result without self-modification thus eliminating the need for simulation to calculate the expected results.

In accordance with the third embodiment (i.e. where only the branch conditions are reversed), upon executing the branch test pattern, for the first encountered controlling node, self-modifying code generation logic 304 only reverses the branch conditions encoded in the branch instruction operation code. For example, originally if the first branch is taken (i.e. transfers control to the "taken node" if the condition bit in the condition register that it depends on is a 1 then the second branch is taken (i.e. transfers control to the "not taken node" if the same condition bit (in the condition register) that it depends on is a 0. Now, self-modifying code generation logic 304 reverses these conditions. That is, now the first branch (which was the second branch prior to the swap) will be "taken" if the condition bit it is dependent on is a 1 and the second branch (which was the first branch prior to the swap) will be "taken" if the same condition bit is a 0. In another embodiment, the controlling node may also only choose to modify the conditions encoded in the branch instructions (that is without swapping them). Thus in effect if only the conditions are reversed, the path taken through the graph for each execution pattern is different from the path taken without self-modification. Thus, the actual results have to be compared with the simulation (or expected) results.

For each execution pattern loaded into the Condition Register, the actual execution starts at a random node within the graph. As the execution proceeds to a controlling node, the instructions built in that node by the self-modifying code generation logic 304 modify the branches of all its controlled nodes. That is, self-modifying code generation logic 304 either swaps the branch instructions or complements the conditions they are dependent on or both. Thus, the controlled nodes execute their instructions as modified by the controlling node.

The process continues for each node until the end node is reached. Once the end node is reached, self-modifying code generation logic 304 restores the branch instructions of all the "controlled nodes" to their original configuration, which includes the displacement (target address) fields and/or the branch conditions (depending on whether they were reversed with the self-modifying code generation logic). This ensures that the controlled nodes are self-healed after the modification so as to be ready for the next execution with another execution pattern.

During execution, for each path that is chosen as a taken path or a not-taken path, a predetermined one of registers 308 are updated. Hence, registers 308 contain the counts for the taken and not-taken paths. Once execution reaches the end node, the branch test pattern is considered to have completed and branch exerciser 302 compares values in the predetermined registers 308 with the expected counts in expected results 326 for the taken and not-taken paths. If there is a mismatch, branch exerciser 302 dumps out the test case along with the actual and expected values of the predetermined ones of registers 308, which may also be referred to as context information, for use in a debugging process. In addition, the expected results in all other registers as well as memory locations are compared to the actual values.

If there is no mismatch, then branch exerciser 302 determines whether there is another execution pattern to be tested. If there is another execution pattern, branch exerciser 302 selects a next pattern and the test is repeated. If there is not another execution pattern, then branch exerciser 302 determines whether the restructure count in restructure count 310 has been exceeded. If restructure count 310 has not been exceeded, branch exerciser 302 builds a new branch test pattern 330 with the same set of nodes but with a different branch pattern between the nodes. If the restructure count has been exceeded, then branch exerciser 302 ends its verification of L1 I-cache coherency and L1 D-cache coherency logic.

The following is an example of validating L1 I-cache coherency and L1 D-cache coherency logic that utilizes an execution pattern 101001 selected from the execution pattern pool, which is loaded into the condition register (CR) for the first execution, and a selection of controlling nodes 2, 4, and 6, where node 2 is a controlling node for nodes 4, 6, and 7, node 4 is a controlling node for node 3, and node 6 is a controlling node for node 3.

Figure 5:
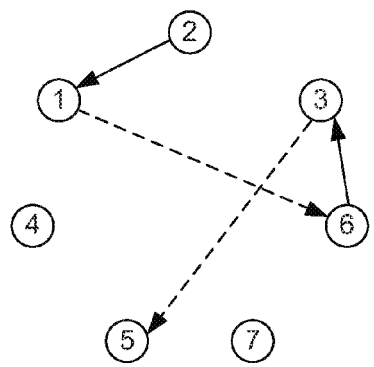
FIG. 5 illustrates an example of an execution pattern using the branch test pattern of FIG. 4G in accordance with an illustrative embodiment.

FIG. 5 illustrates an example of an execution path using the branch test pattern of FIG. 4G in accordance with an illustrative embodiment. FIG. 5 illustrates the execution path taken through the graph structure for a given execution pattern. Since any branch instruction depends on a particular condition being satisfied, i.e. depends on bits of the condition register, a pattern loaded into this condition register is called the "execution pattern." This execution pattern is loaded into the condition register before every re-execution of the branch test pattern. The branch instruction may be encoded to take a branch based on a particular condition register bit being 1 or 0. For example, with regard to FIG. 5, a branch is taken (execution follows a solid line) from a node if a bit in the condition register that it depends on is a 1, otherwise the branch is not-taken (execution follows a dashed line) if a bit in the condition register that it depends on is a 0. Although for the example an assumption is made that the branch is taken if the condition register bit that the branch depends on is a 1 and not-taken if it is a 0, the reverse is also possible, i.e. branch can be taken if the condition register bit is 0 and not-taken if the bit is 1. Therefore, if an execution pattern is selected from the execution pattern pool is 101001 into the condition register (CR) for the first execution, then from node 2 where execution begins, the first bit is a 1 so the taken path will be used to go to node 1. Since the second bit is a 0, then node 1 uses the not-taken path to go to node 6. The third bit is a 1, thus node 6 uses the taken path to go to node 3. Finally, the fourth bit is a 0, so node 3 uses the not-taken path to go to node 5. Since 5 is the end node, execution ends.

Figure 6A:
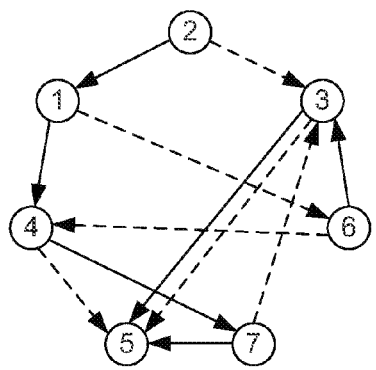
FIGS. 6A-6D illustrate the swapping and/or condition reversal performed by the various controlling nodes on one or more of their controlled nodes during execution of an execution pattern in accordance with an illustrative embodiment.
Figure 6B:
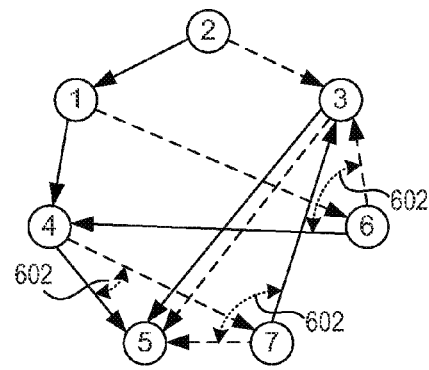
Figure 6C:
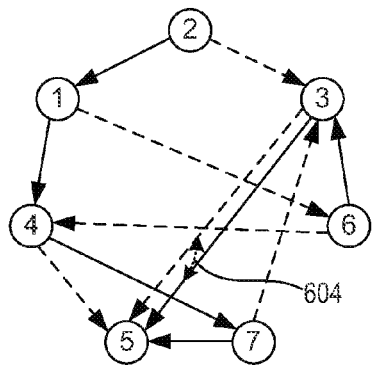
Figure 6D:
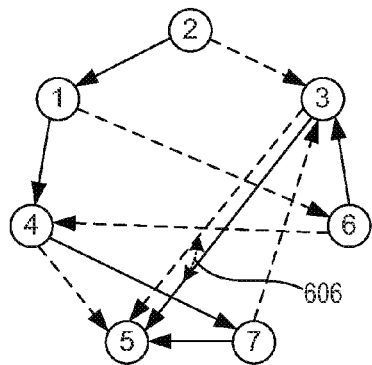

FIGS. 6A-6D illustrate the swapping and/or condition reversal as well as condition reversals performed by the various controlling nodes on one or more of their controlled nodes during execution of an execution pattern in accordance with an illustrative embodiment. FIG. 6A which is the same as FIG. 4G illustrates the original branch test pattern. Upon execution starting at node 2, node 2 swaps the taken and not-taken branches exiting from nodes 4, 6, and 7, which is illustrated in FIG. 6B by swap arrows 602. If during execution of the execution pattern node 4 is reached, then node 4 swaps the taken and not-taken branches exiting from node 3, which is illustrated in FIG. 6C by swap arrow 604. Similarly, if during execution of the execution pattern node 6 is reached, then node 6 swaps the taken and not-taken branches exiting from node 3, which is illustrated in FIG. 6D by swap arrow 606.

While not illustrated, the reversing of the conditions encoded in the branch instructions of the controlled node(s) without swapping them leads to a similar result to that illustrated in FIG. 6B-6D where both swapping and condition reversals occur. That is, only the branch conditions being reversed results in the same effect as when both "swapping" and "condition reversal" of the pair of branch instructions of the controlled node(s) are performed.

FIGS. 7A-7E illustrate an example of the exemplary execution path taken with a given execution pattern through the generated branch test pattern of FIG. 6A where both swapping of the branch patterns and condition reversals occur as shown in FIGS. 6B-6D, when encountered, in accordance with an illustrative embodiment. Since any branch instruction depends on a particular condition being satisfied, i.e. depends on bits of the condition register, a pattern loaded into this condition register is called the "execution pattern." This execution pattern is loaded into the condition register before every re-execution of the branch test pattern. The branch instruction may be encoded to take a branch based on a particular condition register bit being 1 or 0. For example, with regard to FIGS. 6A-6D, a branch is taken (execution follows a solid line) from a node if a bit in the condition register that it depends on is a 1, otherwise the branch is not-taken (execution follows a dashed line) if a bit in the condition register that it depends on is a 0. Although for the example an assumption is made that the branch is taken if the condition register bit that the branch depends on is a 1 and not-taken if it is a 0, the reverse is also possible, i.e. branch can be taken if the condition register bit is 0 and not-taken if the bit is 1.

FIG. 7A illustrates execution starting at node 2, where node 2 swaps the taken and not-taken branches exiting from node 4, 6, and 7 in addition to reversing the conditions encoded in them, which is illustrated in FIG. 6B. Then from node 2 where execution begins, the first bit in the CR is a 1 so the taken path will be used to go to node 1. Moving to FIG. 7B, since node 1 is not a controlling node and since the second bit in the CR is a 0, then node 1 uses the not-taken path to go to node 6. In FIG. 7C, since node 6 is both a controlling node and controlled node, then, prior to executing its exiting branch instructions, node 6, operating as a controlling node, swaps the taken and not-taken branches exiting from node 3 as well as reversing the conditions encoded in them, which is illustrated in FIG. 6D. However, in contrast to FIG. 5, instead of going to node 3, since the taken and not-taken paths have been swapped and the conditions reversed previously by its controlling node which is 2 and since the third bit in the CR is a 1, node 6 as a controlled node will go to node 4. That is, originally (i.e. without self-modification), the first branch would have passed control to node 3 if the CR bit it is dependent on was a 1 and the second branch would have passed control to node 4 if the same CR bit was a 0. Now, since the branch instructions are swapped as well as their conditions reversed, the first branch (which was previously the second branch) will pass control to node 4 if the CR bit it is dependent on is a 1 and the second branch (which was previously the first branch) will pass control to node 3 if the same CR bit is a 0. Since the CR bit is a 1, control passes from node 6 to node 4 via the first branch.

In FIG. 7D, since node 4 is both a controlling node and controlled node, then, prior to executing the next branch instruction, node 4, operating as a controlling node, swaps the taken and not-taken branches exiting from node 3 as well as reversing its conditions, which is illustrated in FIG. 6C. However, in contrast to FIG. 5, instead of going to node 3, since the taken and not-taken paths have been swapped as well as conditions reversed and since the fourth bit in the CR is a 0, node 4 as a controlled node will go to node 7. That is, originally (i.e. without self-modification), the first branch would have passed control to node 7 if the CR bit it is dependent on was a 1 and the second branch would have passed control to node 5 if the same CR bit was a 0. Now, since the branch instructions are swapped as well as their conditions reversed, the first branch (which was previously the second branch) will pass control to node 5 if the CR bit it is dependent on is a 1 and the second branch (which was previously the first branch) will pass control to node 7 if the same CR bit is a 0. Since the CR bit is a 0, control passes from node 4 to node 7 via the second branch.

In FIG. 7E, since node 7 is a controlled node and since the fifth bit in the CR is a 0, in contrast to FIG. 5, instead of going to node 3, node 7 as a controlled node will go to node 5. That is, originally (i.e. without self-modification), the first branch would have passed control to node 5 if the CR bit it is dependent on was a 1 and the second branch would have passed control to node 3 if the same CR bit was a 0. Now, since the branch instructions are swapped as well as their conditions reversed, the first branch (which was previously the second branch) will pass control to node 3 if the CR bit it is dependent on is a 1 and the second branch (which was previously the first branch) will pass control to node 5 if the same CR bit is a 0. Since the CR bit is a 0, control passes from node 7 to node 5 via the second branch. Since node 5 is the end node, execution ends. At this point, the self-modifying code generation logic of FIG. 4 restores the branch instructions of the "controlled nodes" to their original configuration, which includes the displacement files and the dependency conditions.

Although not illustrated, having the controlling node modify only the conditions encoded in the branch instructions of its controlled node(s) has the same effect on execution as illustrated in FIGS. 7A-7E.

Figure 8A:
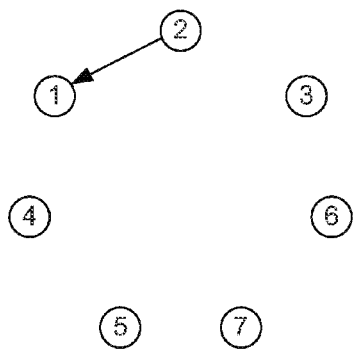
FIGS. 8A-8D illustrate an example of the exemplary execution path taken with a given execution pattern through the generated branch test pattern of FIG. 6A where only the branch patterns are swapped without reversing the conditions that the branches are dependent on in accordance with an illustrative embodiment.
Figure 8B:
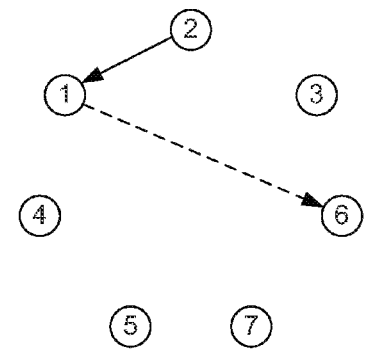
Figure 8C:
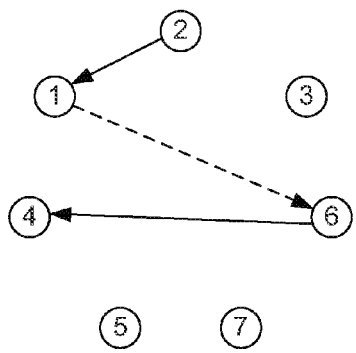
Figure 8D:
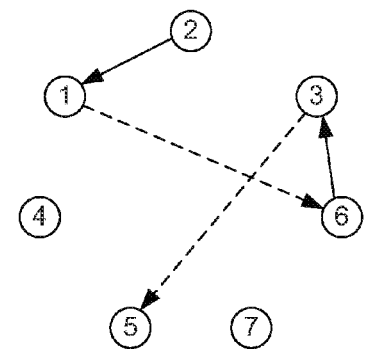

FIGS. 8A-8D illustrate an example of the exemplary execution path taken with a given execution pattern through the generated branch test pattern of FIG. 6A where only the branch patterns are swapped without reversing the conditions that the branches are dependent on in accordance with an illustrative embodiment. FIG. 8A illustrates execution starting at node 2, where node 2 swaps the taken and not-taken branches exiting from node 4, 6, and 7. Then from node 2 where execution begins, the first bit in the CR is a 1 so the taken path will be used to go to node 1. Moving to FIG. 8B, since node 1 is not a controlling node and since the second bit in the CR is a 0, then node 1 uses the not-taken path to go to node 6. In FIG. 8C, since node 6 is both a controlling node and controlled node, then, prior to executing its exiting branch instructions, node 6, operating as a controlling node, swaps the taken and not-taken branches exiting from node 3. However, since only the taken and not-taken paths of node 6 have been swapped previously by node 2 without the conditions reversed and since the third bit in the CR is a 1, node 6 as a controlled node will still go to node 3. In FIG. 8D, since node 3 is just a controlled node and since both the taken and not-taken paths going to node 5, then the execution proceeds to node 5. Since node 5 is the end node, execution ends. At this point, the self-modifying code generation logic of FIG. 3 restores the branch instructions of the "controlled nodes" to their original configuration, which includes swapping back the branches and restoring the displacement files.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 9A:
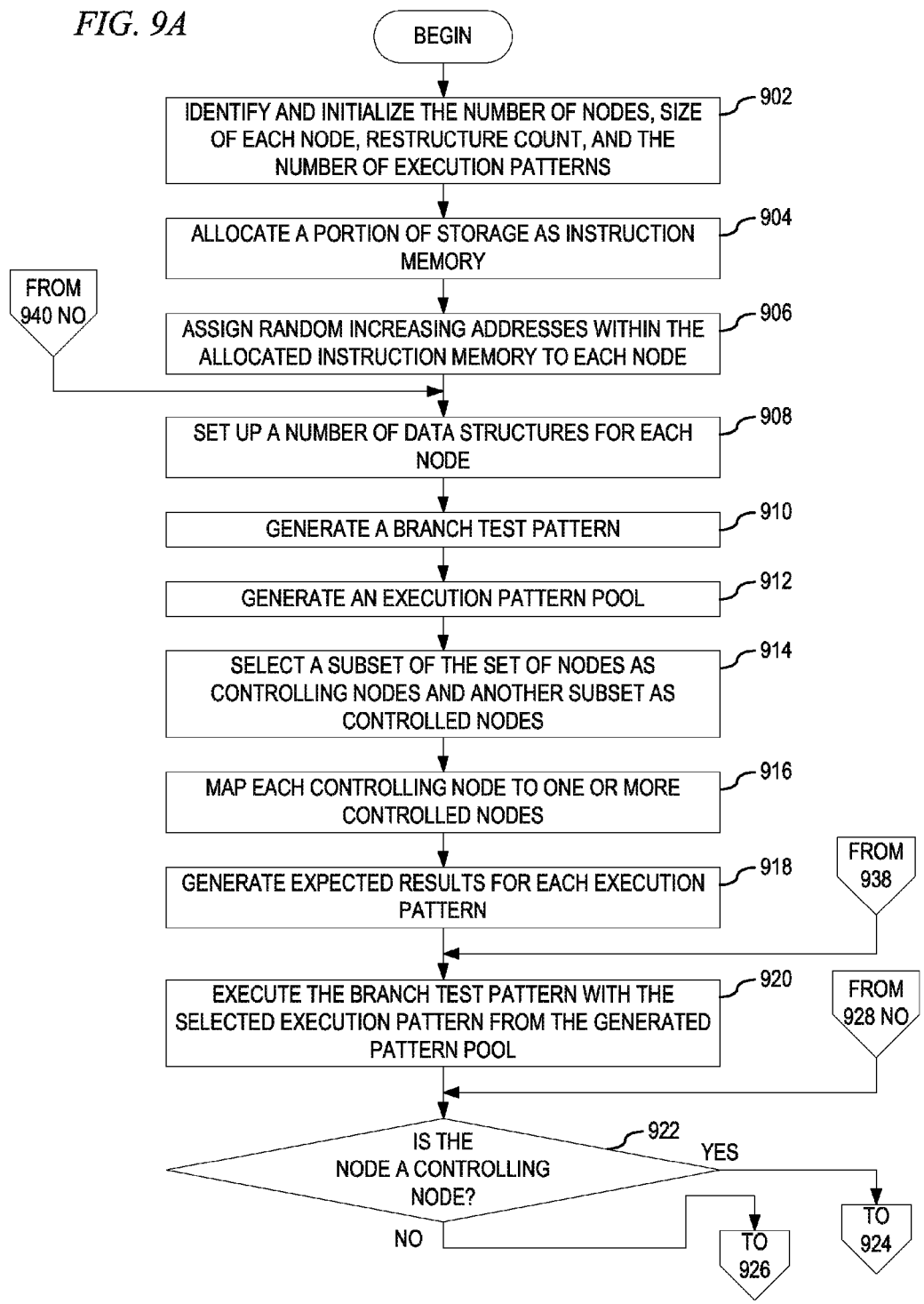
FIGS. 9A-9B depict an exemplary flowchart of the operation performed in validating L1 I-cache coherency and L1 D-cache coherency logic within a processor by swapping the branch instructions and/or reversing the conditions that the branches are dependent on in accordance with an illustrative embodiment.
Figure 9B:
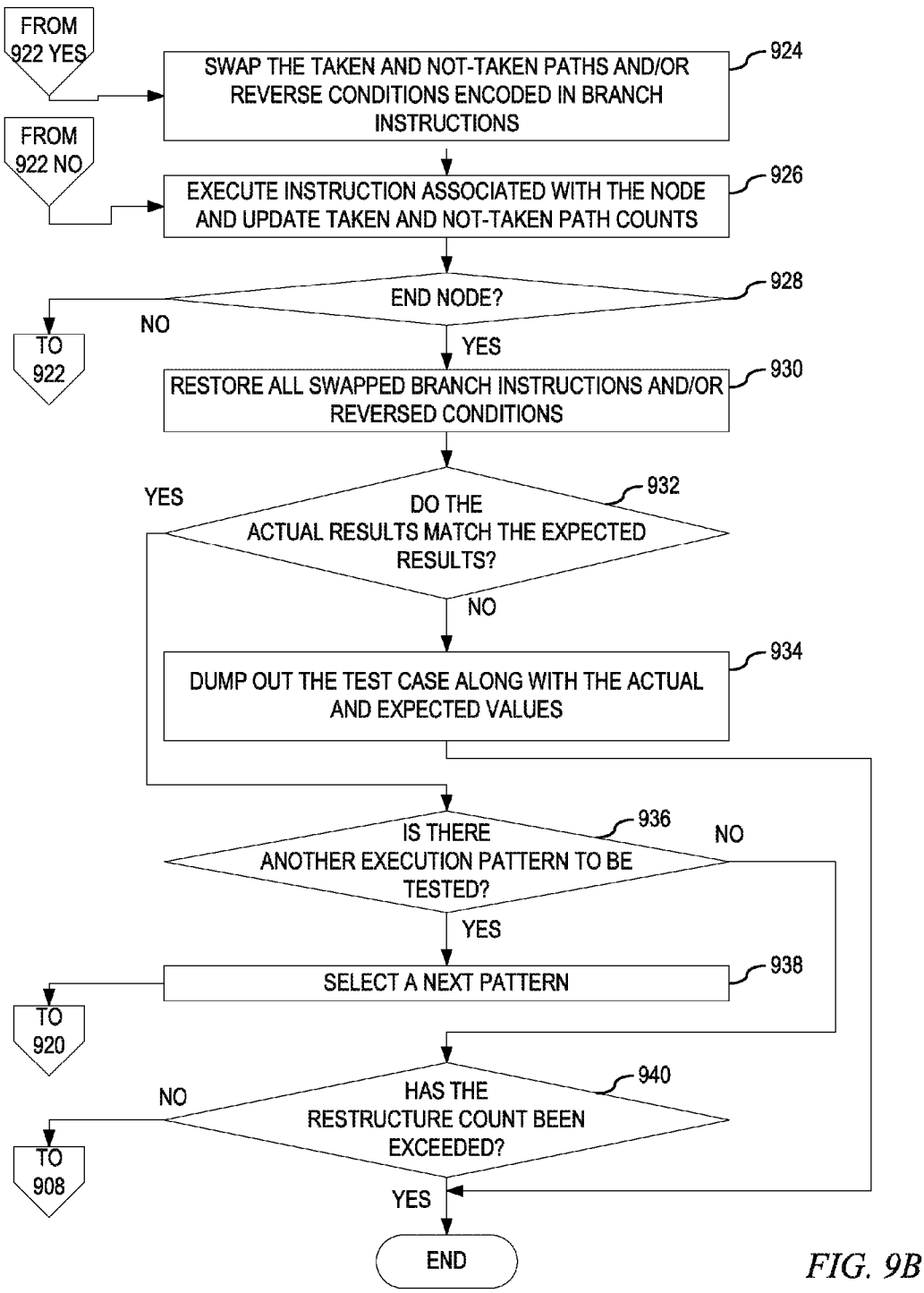

FIGS. 9A-9B depict an exemplary flowchart of the operation performed in validating L1 I-cache coherency and L1 D-cache coherency logic within a processor by swapping the branch instructions and/or reversing the conditions that the branches are dependent on in accordance with an illustrative embodiment. As the operation begins, a branch exerciser initializes and sets a restructure count and a set of initial nodes (I) (step 902). In setting up the set of initial nodes (I), the branch exerciser allocates a portion of storage as instruction memory within which branch blocks of instructions will be created (step 904). For each node in the set of initial nodes (I), the branch exerciser assigns increasing addresses within the allocated instruction memory to each node (step 906).

The branch exerciser also sets up a number of data structures for each node (step 908). The data structures comprise a not-taken node data structure that records a not-taken path (node) for a current node, a taken node data structure that records a taken path (node) for the current node, a deadlock prevention table (DPT) that records for each node, a set of nodes that cannot be chosen for the taken/not-taken paths from the current node, and a taken/not-taken (TINT) candidate list records the list of nodes that may be chosen for the taken/not-taken paths from the current node. The branch exerciser then generates a branch test pattern for execution by the execution unit (step 910). The branch exerciser then generates an execution pattern pool in which execution patterns, which may be loaded into the Condition Register (CR) before every re-execution, are stored (step 912). Each execution pattern may be either user defined or pseudo-randomly generated.

The self-modifying code generation logic pseudo-randomly selects a subset of the set of nodes as controlling nodes that are mapped to another mutually exclusive selected subset of the set of nodes, which are referred to as controlled nodes (step 914). The self-modifying code generation logic maps each controlling node to one or more controlled nodes (step 916). The branch exerciser then generates expected results for each execution pattern in the execution pattern pool (step 918).

The branch exerciser executes the branch test pattern with the selected execution pattern from the generated pattern pool (step 920). Upon executing the branch test pattern, for each node, the self-modifying code generation logic determines whether the node is a controlling node (step 922). If at step 922 the node is a controlling node, then the self-modifying code generation logic swaps the taken and not-taken paths exiting from one or more controlled nodes mapped to the controlling node, corrects displacement fields associated with the taken and not-taken branch instructions associated with each controlled node, and/or reverses conditions on which the taken and not-taken branch instructions are dependent (step 924).

From step 924 or if at step 922 the node fails to be a controlling node, the branch exerciser executes the instructions associated with the node and updates the taken and not-taken path counts (step 926). The branch exerciser then determines whether the current node is the end node (step 928). If at step 928 the current node is not the end node, then the operation returns to step 922. If at step 928 the current node is the end node, then the self-modifying code generation logic restores the branch instructions of the "controlled nodes" to their original configuration, which includes the displacement files and the dependency conditions (step 930). This ensures that the branch instructions are self-healed after the modification so as to be ready for the next execution with another execution pattern.

Once execution reaches the end node, the branch test pattern is considered to have completed and the branch exerciser compares the actual values to the expected values (step 932). If at step 932 there is a mismatch, the branch exerciser dumps out the test case along with the actual and expected values registers and memory locations touched, which may also be referred to as context information, for use in a debugging process (step 934), with the operation ending thereafter.

If at step 932 there is no mismatch, then the branch exerciser determines whether there is another execution pattern to be tested (step 936). If at step 936 there is another execution pattern, the branch exerciser selects a next execution pattern (step 938), with the operation retuning to step 920 thereafter. If at step 936 there is not another execution pattern, then the branch exerciser determines whether the restructure count has been exceeded (step 940). If at step 940 the restructure count has not been exceeded, the operation proceeds to step 908. If at step 940 the restructure count has been exceeded, then the branch exerciser ends its verification of the L1 I-cache coherency and L1 D-cache coherency logic.

Figure 10:
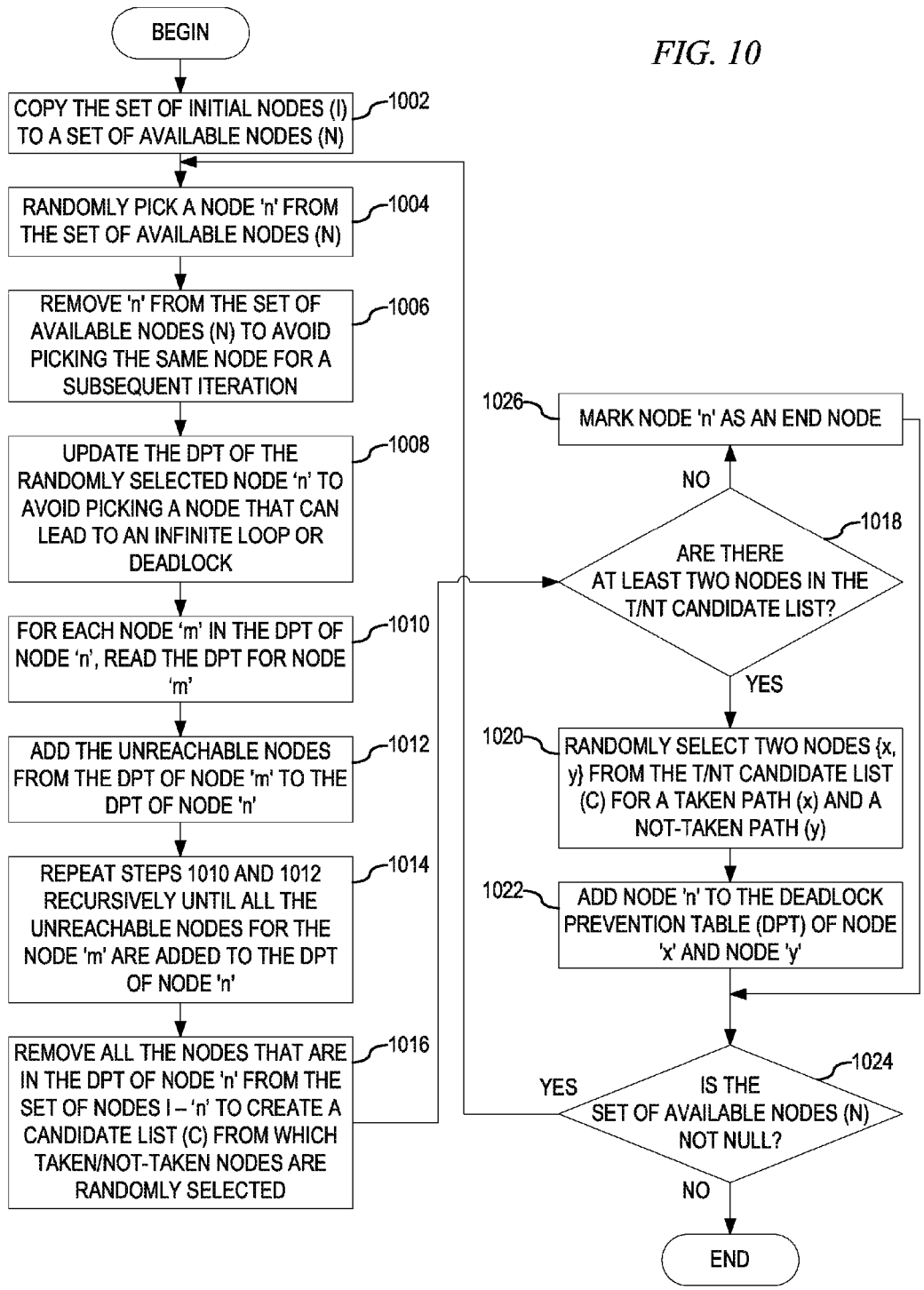
FIG. 10 depicts an exemplary flowchart of the operation performed in generating a branch test pattern in accordance with an illustrative embodiment.

FIG. 10 depicts an exemplary flowchart of the operation performed in generating a branch test pattern in accordance with an illustrative embodiment. As the operation begins, a branch exerciser copies the set of initial nodes (I) to a set of available nodes (N) (step 1002). The branch exerciser then randomly picks a node 'n' from the set of available nodes (N), where N is the set of nodes that still need to be processed (step 1004). The branch exerciser then removes 'n' from the set of available nodes (N) to avoid picking the same node for a subsequent iteration (step 1006). The branch exerciser then updates the deadlock prevention table (DPT) of the randomly selected node 'n' to avoid picking a node that can lead to an infinite loop or deadlock (step 1008).

In performing the update, for each node 'm' in the deadlock prevention table for node 'n', the branch exerciser reads the deadlock prevention table for node 'm' (step 1010), adds the unreachable nodes from the deadlock prevention table (DPT) of node 'm' to deadlock prevention table (DPT) of node 'n' (step 1012), and repeats steps 1010 and 1012 recursively until all the unreachable nodes for the node 'm' are added to the deadlock prevention table (DPT) of node 'n' (step 1014). Once the deadlock prevention table (DPT) of node 'n' has been updated, the branch exerciser removes all the nodes that are in the DPT of node 'n' from the set of nodes I-'n' to create a candidate list (C) from which taken/not-taken nodes are randomly selected (step 1016). That is, consider a set D that contains all nodes in the deadlock prevention table (DPT) for node 'n'. Then, consider a set C=I-D-'n', i.e. the set of nodes in the initial set of nodes (I) that are not in the deadlock prevention table (DPT) for node 'n'. This set C is the taken/not-taken (T/NT) candidate list for node 'n'.

The branch exerciser unit then determines whether there are at least two nodes in the taken/not-taken (T/NT) candidate list (step 1018). If at step 1018 there are at least two nodes in the taken/not-taken (T/NT) candidate list, the branch exerciser then randomly selects two nodes {x, y} from the taken/not-taken (T/NT) candidate list (C) for a taken path (x) and a not-taken path (y) (step 1020). The branch exerciser then adds node 'n' to the deadlock prevention table (DPT) of node 'x' and node 'y' (step 1022). The branch exerciser unit then determines whether the set of nodes still to be processed 'N' is not a NULL set (step 1024). If at step 1024 the set of nodes still to be processed 'N' is not a NULL set, then the operation (build algorithm) returns to step 1004. If at step 1024 the set of nodes still to be processed 'N' is NULL, then the operation (building process) terminates. If at step 1018 there fails to be at least two nodes in the taken/not-taken (T/NT) candidate list, the branch exerciser marks the node 'n' as end node (step 1026) and proceeds to step 1024.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for stressing and validating L1 Instruction cache (L1 I-Cache) and L1 Data Cache (L1 D-Cache) coherency protocol of a processor. For each execution pattern in the execution pattern, a self-modifying branch execution stream modifies branch streams by assuming that the branches in the reachable. Further, controlled nodes are executed in the order that a controlling node sets for the controlled nodes and not by the way they are built by the branch pattern test generation module. Thus, through self-modification, L1 Instruction cache (L1 I-Cache) and L1 Data Cache (L1 D-Cache) coherency issues are identified by a mismatch between the actual path or the actual result taken by the hardware and the expected path or result.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for validating cache coherency within a processor, the method comprising:

generating, by a processor, a self-modifying branch test pattern for execution by one or more processors that is under validation testing;

selecting, by the processor, an execution pattern from a set of execution patterns thereby forming a selected execution pattern;

loading, by the processor, the selected execution pattern into a condition register;

executing the self-modifying branch test pattern by: for each node in a set of nodes:

determining, by the processor, whether a node in a set of nodes is a controlling node;

responsive to the node being a controlling node, performing, by the processor, at least one action on each controlled node mapped to the controlling node; and after performing the at least one action on each controlled node mapped to the controlling node or responsive to the node failing to he a controlling node, executing, by the processor, an instruction of the self-modifying branch test pattern associated with the node based on the selected execution pattern in the condition register;

comparing, by the processor, values output during execution of the self-modifying branch test pattern based on the selected execution pattern in the condition register to a set of expected results;

responsive to a match of the comparison of the values output during execution of the self-modifying branch test pattern based on the selected execution pattern in the condition register to the set of expected results, repeating, by the processor, the execution of the self-modifying branch test pattern for each execution pattern in the set of execution patterns; and responsive to a match of each comparison of the values output during each execution of the self-modifying branch test pattern to the set of expected results, validating, by the processor, the cache coherency.

2. The method of claim 1, wherein the at least one action is swapping a taken and not-taken path exiting from each controlled node or reversing conditions encoded for the two branch instructions within each controlled node.

3. The method of claim 1, further comprising:
prior to each repetition of the execution of the self-modifying branch test pattern, restoring, by the processor, a taken path and a not-taken path exiting from each controlled node to their original states before performing the at least one action; or
prior to each repetition of the execution of the self-modifying branch test pattern, restoring, by the processor, the conditions encoded for the two branch instructions within each controlled node to their original states before performing the at least one action.

4. The method of claim 1, wherein each execution pattern in the set of execution patterns is either user defined or pseudo-randomly generated.

5. The method of claim 1, further comprising:
responsive to a mismatch of a comparison of the values output during each execution of the self-modifying branch test pattern to the set of expected results, invalidating, by the processor, the cache coherency; and
dumping out, by the processor, the self-modifying branch test pattern based on the selected execution pattern in the condition register along with all context information for use in a debugging process.

6. The method of claim 1, wherein the execution of the self-modifying branch test pattern is repeated for each execution pattern in the set of execution patterns up to a point where a restructure count is exceeded, and wherein, when the restructure count is exceeded and all previous comparisons match, the processor validates the execution unit.

7. The method of claim 1, wherein the self-modifying branch test pattern is generated by the method comprising:
copying, by the processor, a set of initial nodes (I) to a set of available nodes (N);
randomly picking, by the processor, a node 'n' from the set of available nodes (N), wherein N is a set of nodes that still need to be processed;
removing, by the processor, the node 'n' from the set of available nodes (N) to avoid picking the same node for a subsequent iteration;
updating, by the processor, a deadlock prevention table (DPT) of node 'n' to avoid picking another node that leads to an infinite loop or deadlock;
removing, by the processor, all nodes in the DPT of node 'n' from the set of available nodes I-'n' in order to create a candidate list (C) from which taken/not-taken nodes are randomly selected;
determining, by the processor, whether here are at least two nodes in the candidate list (C);

responsive to at least two nodes being in the candidate list (C), randomly selecting, by the processor, two nodes {x, y} from the candidate list (C) for a taken path (x) and a not-taken path (y);
adding, by the processor, node 'n' to a deadlock prevention table (DPI) of node 'x' and a deadlock prevention table (DPT) of node 'y';
determining, by the processor, whether the candidate list (C) contains only one element or less than one element;
responsive to the candidate list (C) containing only one element or less than one element, designating, by the processor, a last used node 'n' or remaining node 'n' as an end node; and
generating, by the processor, the self-modifying branch test pattern.

8. The method of claim 7, further comprising:
responsive to the candidate list containing more than one element, repeating, by the processor, the self modifying branch test pattern generation process until the set of available nodes (N) still to be processed in the self-modifying branch test pattern generation process is NULL.

9. The method of claim 7, further comprising:
responsive to a failure of the candidate list (C) having at least two nodes, determining, by the processor, whether the set of available nodes (N) is not NULL; and
responsive to the set of available nodes (N) being not NULL, repeating, by the processor, the process until the set of available nodes (N) is NULL.

10. The method of claim 7, wherein updating the DPT of node 'n' further comprises:
for each node 'm' in the DPT for node 'n', reading, by the processor, a deadlock prevention table (DPT) for node 'm';
adding, by the processor, unreachable nodes from the DPT of node 'm' to the DPT of node 'n'; and
repeating, by the processor, the reading and adding steps recursively until all the unreachable nodes for the node 'm' are added to the DPT of node 'n'.

11. A non-transitory computer program product comprising a computer readable storage medium having a computer readable program stored therein, wherein the computer readable program, when executed on a computing device, causes the computing device to:
generate a self-modifying branch test pattern for execution by one or more processors that is under validation testing;
select an execution pattern from a set of execution patterns thereby forming a selected execution pattern;
load the selected execution pattern into a condition register;
execute the self-modifying branch test pattern by: for each node in a set of nodes:
determine whether a node in a set of nodes is a controlling node;
responsive to the node being a controlling node, perform at least one action on each controlled node mapped to the controlling node; and
after performing the at least one action on each controlled node mapped to the controlling node or responsive to the node failing to be a controlling node, execute an instruction of the self-modifying branch test pattern associated with the node based on the selected execution pattern in the condition register;

compare values output during execution of the self-modifying branch test pattern based on the selected execution pattern in the condition register to a set of expected results;

responsive to a match of the comparison of the values output during execution of the self-modifying branch test pattern based on the selected execution pattern in the condition register to the set of expected results, repeat the execution of the self-modifying branch test pattern for each execution pattern in the set of execution patterns; and responsive to a match of each comparison of the values output during, each execution of the self-modifying branch test pattern to the set of expected results, validate the cache coherency.

12. The computer program product of claim 11, wherein the at least one action is swapping a taken and not-taken path exiting from each controlled node or reversing conditions encoded for the two branch instructions within each controlled node.

13. The computer program product of claim 11, wherein the computer readable program further causes the computing device to:

prior to each repetition of the execution of the self-modifying branch test pattern, restore a taken path and a not-taken path exiting from each controlled node to their original states before performing the at least one action; or prior to each repetition of the execution of the self-modifying branch test pattern, restore the conditions encoded for the two branch instructions within each controlled node to their original states before performing the at least one action.

14. The computer program product of claim 11, wherein each execution pattern in the set of execution patterns is either user defined or pseudo-randomly generated.

15. The computer program product of claim 11, wherein the computer readable program further causes the computing device to:

responsive to a mismatch of a comparison of the values output during each execution of the self-modifying branch test pattern to the set of expected results, invalidate the cache coherency; and dump out the self-modifying branch test pattern based on the selected execution pattern in the condition register along with all context information for use in a debugging process.

16. An apparatus, comprising:
a processor; and
a memory coupled to the processor, wherein the memory comprises instructions which, when executed by the processor, cause the processor to:
generate a self-modifying branch test pattern for execution by one or more processors that is under validation testing;
select an execution pattern from a set of execution patterns thereby forming a selected execution pattern;
load the selected execution pattern into a condition register;

execute the self-modifying branch test pattern by: for each node in a set of nodes:
determine whether a node in a set of nodes is a controlling node;
responsive to the node being a controlling node, perform at least one action on each controlled node mapped to the controlling node; and
after performing the at least one action on each controlled node mapped to the controlling node or responsive to the node failing to be a controlling node, execute an instruction of the self-modifying branch test pattern associated with the node based on the selected execution pattern in the condition register;

compare values output during execution of the self-modifying branch test pattern based on the selected execution pattern in the condition register to a set of expected results;

responsive to a match of the comparison of the values output during execution of the self-modifying branch test pattern based on the selected execution pattern in the condition register to the set of expected results, repeat the execution of the self-modifying branch test pattern for each execution pattern in the set of execution patterns; and responsive to a match of each comparison of the values output during each execution of the self-modifying branch test pattern to the set of expected results, validate the cache coherency.

17. The apparatus of claim 16, wherein the at least one action is swapping a taken and not-taken path exiting from each controlled node or reversing conditions encoded for the two branch instructions within each controlled node.

18. The apparatus of claim 16, wherein the instructions further cause the processor to:

prior to each repetition of the execution of the self-modifying branch test pattern, restore a taken path and a not-taken path exiting from each controlled node to their original states before performing the at least one action; or prior to each repetition of the execution of the self-modifying branch test pattern, restore the conditions encoded for the two branch instructions within each controlled node to their original states before performing the at least one action.

19. The apparatus of claim 16, wherein each execution pattern in the set of execution patterns is either user defined or pseudo-randomly generated.

20. The apparatus of claim 16, wherein the instructions further cause the processor to:

responsive to a mismatch of a comparison of the values output during each execution of the self-modifying branch test pattern to the set of expected results, invalidate the cache coherency; and dump out the self-modifying branch test pattern based on the selected execution pattern in the condition register along with all context information for use in a debugging process.

* * * * *